(12) United States Patent
Lang (10) Patent No.: US 8,959,537 B2
(45) Date of Patent: Feb. 17, 2015

(54) CONFIGURABLE GENERATION OF PROXIES FOR BACKEND APIS

(71) Applicant: SAP AG, Walldorf (DE)

(72) Inventor: Georg Lang, Ludwigshafen (DE)

(73) Assignee: SAP SE, Walldorf (DE)

(*) Notice: Subject to any disclaimer, the term of this patent is extended or adjusted under 35 U.S.C. 154(b) by 146 days.

(21) Appl. No.: 13/676,618

(22) Filed: Nov. 14, 2012

(65) Prior Publication Data

US 2014/0096149 A1    Apr. 3, 2014

Related U.S. Application Data

(60) Provisional application No. 61/707,773, filed on Sep. 28, 2012.

(51) Int. Cl.
*G06F 3/00* (2006.01)

(52) U.S. Cl.
USPC .......................................... 719/328; 719/330

(58) Field of Classification Search
USPC ................................................ 719/328, 330
See application file for complete search history.

(56) References Cited

U.S. PATENT DOCUMENTS

| | | | |
|---|---|---|---|
| 7,010,796 B1 * | 3/2006 | Strom et al. | 719/328 |
| 7,580,915 B2 * | 8/2009 | Braun et al. | 1/1 |
| 8,285,642 B2 * | 10/2012 | Cesarini et al. | 705/40 |
| 8,307,003 B1 * | 11/2012 | Sheth et al. | 707/790 |
| 2004/0015849 A1 * | 1/2004 | Sanchez, II | 717/116 |
| 2009/0049521 A1 * | 2/2009 | Le Rouzic et al. | 726/4 |
| 2012/0253872 A1 * | 10/2012 | Peters et al. | 705/7.13 |

OTHER PUBLICATIONS

Amitabh, Proxies, Application Interfaces, and Distributed Systems, 1992.*

* cited by examiner

*Primary Examiner* — Lechi Truong (74) *Attorney, Agent, or Firm* — Schwegman Lundberg & Woessner, P.A.

(57) ABSTRACT

A proxy remote function call is created in a first component of an Enterprise Resource Planning (ERP) system, the proxy remote function call acting as a proxy for a previously created remote function call in the first component. A field mapping table may then be maintained for the proxy remote function call, the field mapping table containing a mapping of first data fields used for operation of a process in a second component of the ERP system to second data fields utilized by the remote function call in the first component, at least one of the first data fields mapping to a data field in the second data fields having a different data type and/or different field names. When a call is received from the process on the second component, fields in the parameters of the call may be converted using the field mapping table.

17 Claims, 10 Drawing Sheets

CONFIGURABLE GENERATION OF PROXIES FOR BACKEND APIS

CROSS-REFERENCE TO RELATED APPLICATION

This application claims priority to U.S. Provisional Patent Application Ser. No. 61/707,773, entitled "CONFIGURABLE GENERATION OF PROXIES FOR BACKEND APIs," filed on Sep. 28, 2012.

BACKGROUND

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and manage connections to outside entities. Convergent invoicing (CI) integrates ERP and Customer relationship management (CRM) systems so that organizations with complex billing processes can create, change, and cancel billable accounts for customers, as well as retrieve and view invoicing data for services rendered on demand.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, anew mapping logic is provided for consumption items in an ERP system. Specifically, a component such as convergent charging can be eased so that neither a field semantic, an advanced business application programming (ABAP) internal data type, nor a format of a field are needed to interface with another component, such as convergent invoicing. This approach for technical data type mapping could also be applied to Business information Technology (BIT) mapping, although the focus of this document will be on consumption items.

Figure 1:
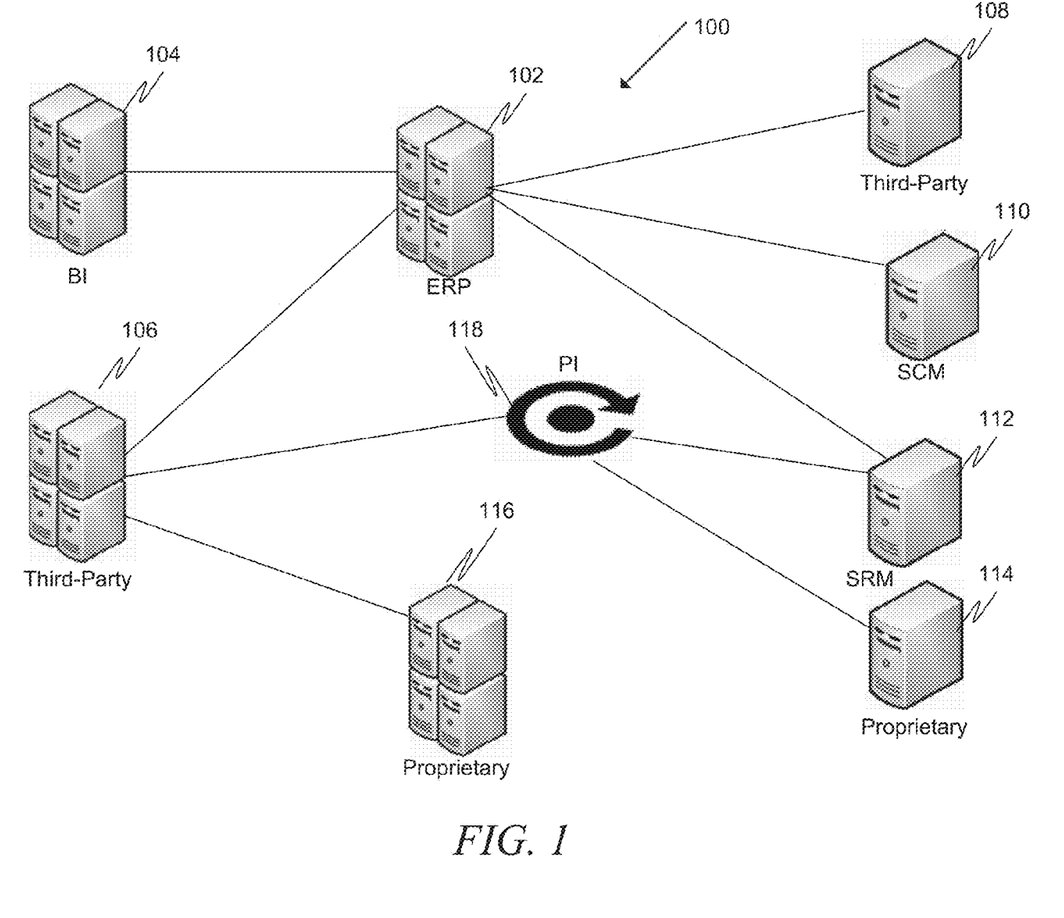
FIG. 1 depicts an application landscape, in accordance with an example embodiment.

FIG. 1 depicts an application landscape, in accordance with an example embodiment. The application landscape 100 comprises different heterogeneous software and/or hardware components 102 to 118, which are connected to each other as shown by the solid lines in FIG. 1, and which may operate together in the application landscape 100 to process, for example, a business scenario. The application landscape 100 may comprise an ERP 102. The ERP 102 may integrate internal and external management information across an entire organization, embracing different activities and/or services of an enterprise. The ERP 102 automates the activities and/or services with an integrated computer-based application. The ERP 102 can run on a variety of hardware and/or network configurations, typically employing a database to store its data. The ERP 102 may be associated with (e.g., directly or indirectly connected to and/or in (networked) communication with) a business intelligence (BI) component 104, one or more third parties 106 and 108, a supply chain management (SCM) component 110, and/or a supplier relationship management (SRM) component 112. The SRM 112 and/or the SCM 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP 102. The SCM component 110 may manage a network of interconnected businesses involved in the provision of product and/or service packages used by end consumers such as the ERP 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP 102 (e.g., to maximize the potential value of those relationships). All of these systems may be integrated via a process integration component 118.

Figure 2:
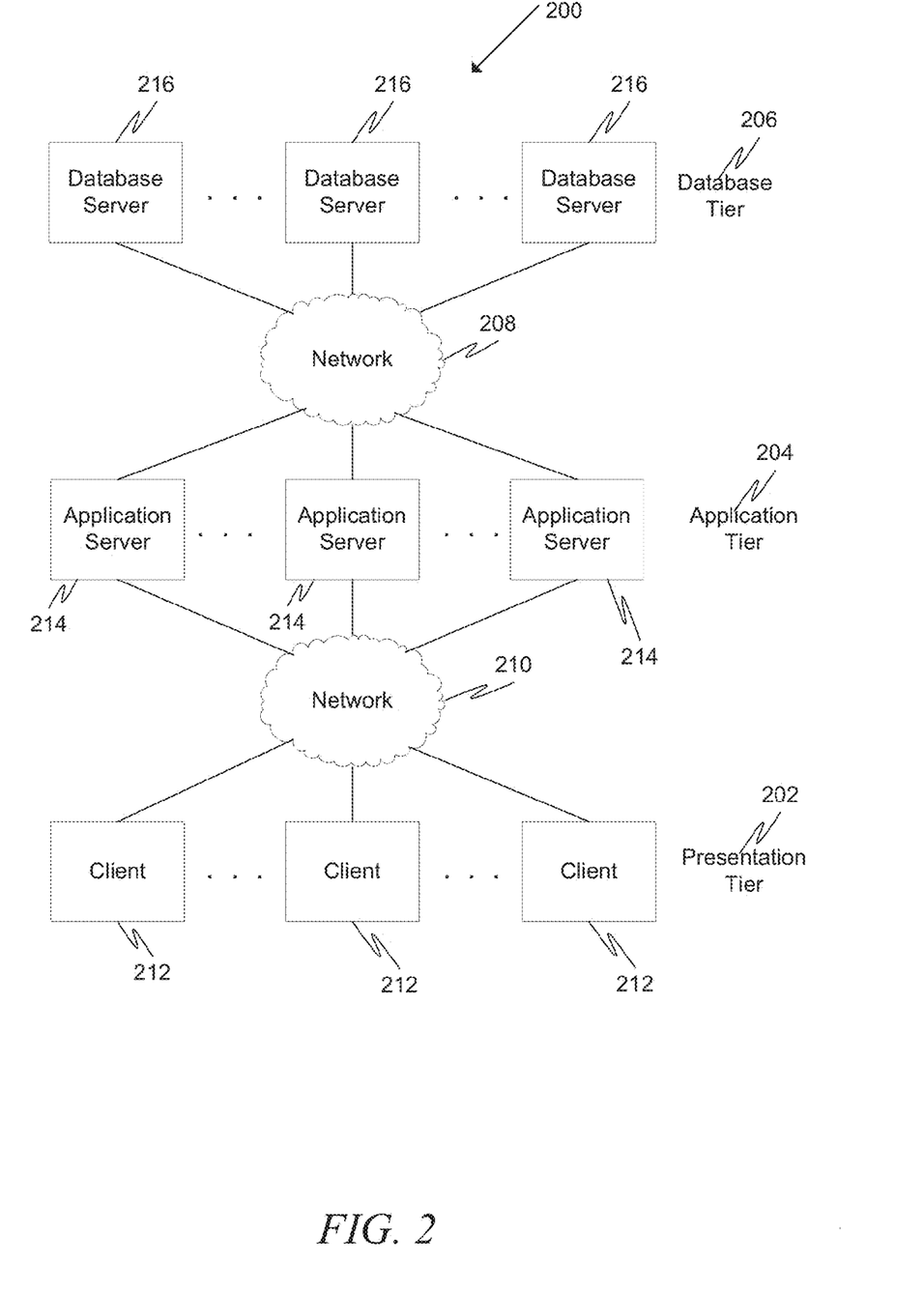
FIG. 2 is a block diagram of a three tier system, in accordance with an example embodiment.

FIG. 2 is a block diagram of a three tier system, in accordance with an example embodiment. The system 200 includes a presentation tier 202, an application tier 204, and a database tier 206. Networks 208, 210 connect the devices within and between the tiers 202, 204, and 206. The networks 208, 210 may include one or more networks, such as a local area network (LAN), a wide area network (WAN), or the Internet.

The presentation tier 202 generally includes one or more client computers 212. The client computers 212 generally provide a graphical user interface for users to interact with the other parts of the system 200. The user interface may be implemented by a browser, for example, as a Java application.

The application tier 204 generally includes one or more application servers 214. The application servers 214 generally implement the business logic for processing interactions between the users and the underlying data. This business logic is generally referred to as "the application" or "the application program." The application tier 204 may implement various applications to perform various functions, such as invoicing, inventory control, supply chain management, and the like. Various of the application servers 214 may perform different functions. For example, one of the application servers 214 may be used for prototyping or development, while the others may be used for business intelligence production activities.

The database tier 206 generally includes one or more database servers 216. The database servers 216 generally implement a database management system that stores and manipulates the underlying data and related metadata. This database management system is generally referred to as "the database," "the database system," or "the database program." The database servers 216 may implement various types of database systems, including DB2, Informix, MaxDB, Oracle and Microsoft SQL Server.

Although many separate devices are shown in each tier, this is mainly for illustration purposes to show scalability. For example, a single database server 216 may be used in the basic configuration, but as the amount of data in the databases increases, the number of database servers 216 may be increased. As another example, a single application server 214 may be used in the basic configuration, but as the amount of business logic processes increases, the number of application servers 214 may be increased.

The various devices in the various tiers may implement different operating systems. For example, a client computer 212 may run Microsoft Windows and an application server 214 may implement Linux. Note that various devices generally implement both an operating system program and another program, which are distinct. For example, a client computer 212 may implement Microsoft Windows (operating system) and Microsoft Internet Explorer (user interface program). An application server 214 may implement Linux (operating system and an invoicing system (application program). A database server 216 may implement Linux (operating system) and Oracle database (database program).

The SAP Web Application Server is a specific example of an implementation of the application landscape 100. An example embodiment generally involves an application program and a database program, as detailed below.

Figure 3:
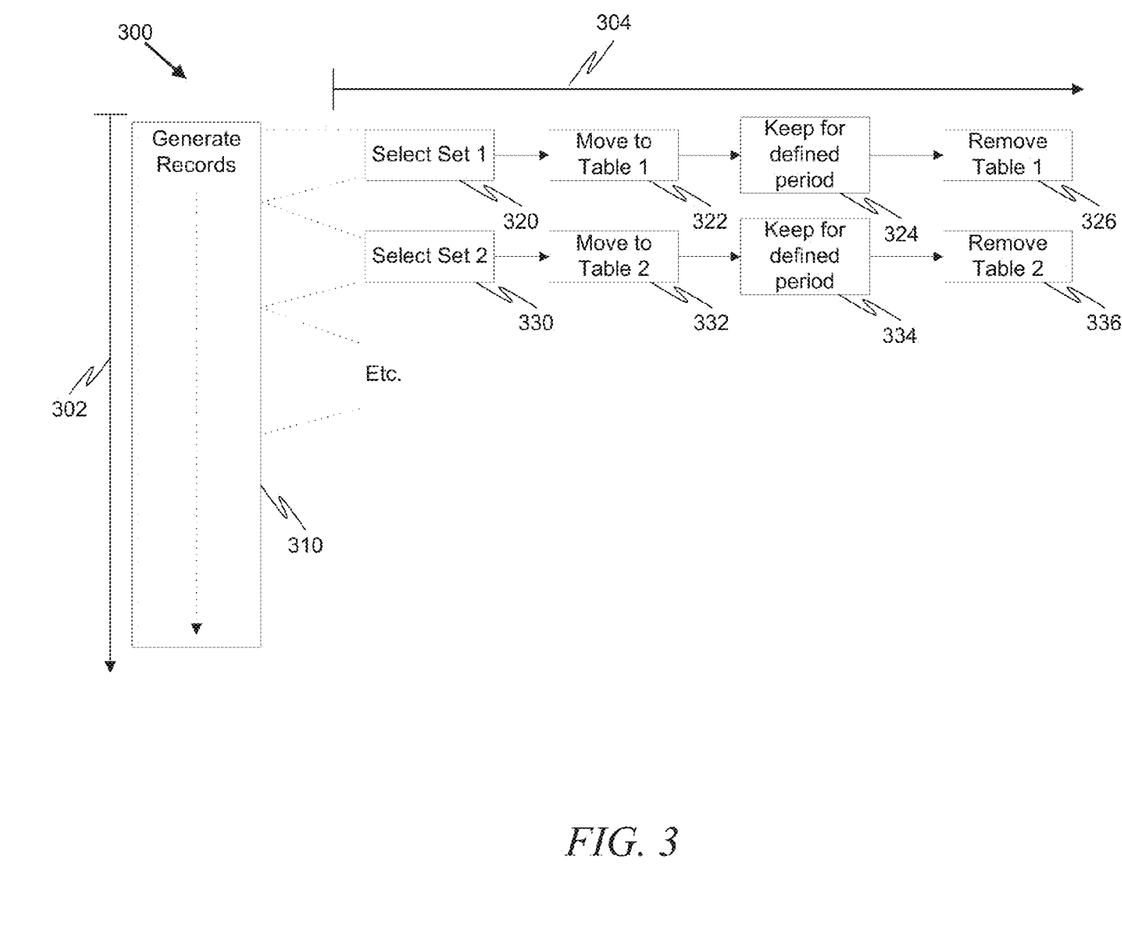
FIG. 3 is a diagram of a timeline that is used to illustrate an example embodiment of a convergent invoicing system.

FIG. 3 is a diagram of a timeline that is used to illustrate an example embodiment of a convergent invoicing system. The timeline 300 includes ay axis 302 and an x axis 304. The y axis 302 shows the flow of a generally continuous data generation process where records 310 are generated. The term "record" generally refers to a line item in a database that includes one or more pieces of data; a record may also be referred to as a "transaction." These records 310 may be (for example) telephone call records, including information such as the calling number, the called number, the start time, the duration, the account number, the applicable tariff, the applicable tax, and the like. These records 310 are being continuously generated by the application program (see the application server 214 in FIG. 2 and related description). In the context of a convergent invoicing system, "generated" also includes receiving records 310 from other systems. For example, Company X may generate a record and send the record to Company Y, in which case Company Y generates a corresponding record in the records 310. The number of records in the records 310 may be very large (for example, 1,000,000 customers each receive an invoice with 100 to 1000 calls every month, times the number of months retained in the records 310). The records 310 may be stored in a table in a database (see the database server 216 in FIG. 2 and related description).

The x axis 304 shows the flow of data processing according to an example embodiment of a convergent invoicing system. At 320, for a given time period, a set of the records are selected from the records 310. The time period may be, for example, a month; and the records selected are those that are to be invoiced for that month. The application program (see the application server 214 in FIG. 2 and related description) may select the set.

In an example embodiment, the set is selected as part of another process that may already be occurring as part of the data processing operations of the system 200 (see FIG. 2). For example, a billing process may already be occurring as one of the data processing operations. In such a case, the set selected for billing is also the set used in the additional processing described below.

At 322, the set selected in 320 is moved to a table in the database. In general, this table includes only the set selected in 320, and no others (e.g., the table excludes the records 310 that are not in the set). The application program (see the application server 214 in FIG. 2 and related description) may instruct the database program (see the database server 216 in FIG. 2 and related description) to move the set to the table in the database. The table may include other information related to the records 310 in the set; for example, the set may be indexed according to the account number associated with each record.

At 324, the table (see 322) is stored for a defined duration. This duration may be set according to various factors. For example, there may be a legal requirement to store the records 310 for a certain amount of time. There may be a contractual arrangement with the customers to store the records 310 for a certain amount of time. The operator of the system 200 (see FIG. 2) may desire to delete records 310 from the database, or to move records 310 from the database to archival storage, after a certain amount of time. The operator of the system 200 (see FIG. 2) may desire to move or delete the records 310 from the database after the associated invoices have been paid. The defined duration may then be selected to account for these time periods, or to account for other criteria.

At 326, the table (see 322) is removed from the database after the defined duration (see 324) has passed. The application program (see the application server 214 in FIG. 2 and related description) may instruct the database program (see the database server 216 in FIG. 2 and related description) to remove the table from the database. The table may be deleted, moved to archival storage, and so forth. If the database program itself includes functionality to move the table to archival storage, then the application program may instruct the database program to do so. Otherwise, the application program may coordinate with other components of the application landscape 100 (see FIG. 1) to move the table from the database to the archival storage. According to an embodiment, the SQL statement DROP TABLE may be used to remove the table.

As the records 310 continue to be generated, other sets may be selected, moved, and removed in a similar manner to that described above (see 320, 322, 324 and 326), as further detailed below.

At 330, for another given time period, a second set of the records are selected from the records 310. In general, this time period immediately follows the preceding time period (see 320) without overlap. For example, if invoices are prepared monthly, then the first time period (see 320) may correspond to January, and the second time period (see 330) may correspond to February. In such a case, there is no duplication of a record in the first set and the second set. According to another example embodiment, the time periods (see 320 and 330) may overlap, in which case there may be duplication of records 310 in the first set and the second set. According to another example embodiment, there may be a gap between the first time period and the second time period, in which case some of the records 310 may not be selected for moving to a table.

At 332, the second set (selected in 330) is moved to a second table in the database. As with the first table (see 322), the second table, in general, excludes any of the records 310 that are not in the second set.

At 334, the second table (see 332) is stored for a defined duration. In general, this defined duration (in 334) has the same length as the first defined duration (in 324). However, the length could also differ. For example, the contractual arrangement with customers may be changed such that the duration is shortened (or lengthened).

At 336, the second table (see 332) is removed from the database after the defined duration (see 334) has passed.

In a similar manner, additional sets of data beyond the two shown and described may be selected, moved to tables, and the tables removed, as the records 310 continue to be generated. According to an example embodiment, the records 310 in the tables may be further arranged according to the account status (e.g., unbilled records, billed records, settled invoices, etc.). In general, these tables may be referred to as "parallel tables" in which the transactional data is divided. amongst the tables in a "parallel" manner. Such an arrangement may be contrasted with existing transactional data processing systems that store the transactional data in a single table (e.g., the data is added to the single table for example in a "sequential" or "serial" manner).

The following discussion provides more details of a specific implementation of an invoicing system that implements one or more of the data processing features that are described above. The invoicing system may be referred to as a convergent invoicing system, in that it generates a convergent invoice where billing data from various sources is aggregated into a single invoice and is processed together. In general, the convergent invoicing system provides the interface to the account receivables system; handles account receivables charges, discounts and taxes; and supports invoice data extraction and formatting for print. The convergent invoicing system may be part of another component, such as a contract accounts and receivable and payable (FI-CA) component, that may be part of a larger software system such as an enterprise resource planning financials program (which will be described later in reference to FIG. 4). The convergent invoicing system may include a billing subcomponent and an invoicing subcomponent.

The billing subcomponent processes transactions and additional data from other systems and creates structured invoice content. Billing provides a billable item management feature that allows a user to transfer, store and monitor billable items and prepare them for billing execution. The billing subcomponent covers the handling of billable items for the purpose of creating, simulating and reversing billing documents.

The invoicing subcomponent allows a user to create convergent invoices, it merges billing information from a local billing system and billing systems from other providers into customer invoices. The invoicing process integrates the billing documents in the invoicing subcomponent. The invoicing subcomponent creates the invoice document that saves the information for the invoice and that is the base for the physical invoice printings and posts the invoice synchronously (although in some embodiments this can also be performed asynchronously). Additionally, the invoicing subcomponent may perform the following tasks: (1) billing documents from different billing systems are selected, grouped, and displayed together on one invoice; (2) billing documents are transferred to postings documents in the FI-CA component synchronously (the invoice display of the tax amounts can influence the tax to be posted. Note that this process could also be performed asynchronously); (3) simultaneously, correspondence containers are created fir invoice printing, and additional data is updated for providing data to a business intelligence system 104; and (4) current information for the customer account, such as open invoice receivables, can be displayed on the invoice. Further FI-CA business transactions can be integrated in the invoicing processes such that the customer can be informed of changes to the customer account with the invoice. For example, in an invoicing run, contract account maintenance can be processed by the run. The invoicing run can clear open items of an invoice with credit memo items of a contract account.

In general, invoicing orders exist when an invoicing process is started. These are created when a billing document is created and are used for specific selection of the billing documents not yet processed by an invoicing process. If the invoicing of a billing document is successful, the related invoicing order is deleted.

In addition to billing documents that arise in the local system from the transfer of billing documents from external systems, sales and distribution (SD) billing documents from the SD component and collective bills from the FI-CA component can also be understood as invoiceable billing documents. Special invoicing processes can process these source documents, provided there are invoicing orders of the corresponding source document category.

Parallel processing of the dataset is generally possible. The invoicing processes use the function of the mass activity in FI-CA to split the dataset and distribute processing to different processes in order to reduce the processing time. Parallel processing may also be performed during part or all of the process described in FIG. 3.

The Contract Accounts Receivable and Payable component is a subledger developed for industries with a large number of business partners and a correspondingly high volume of documents to post, such as telecommunications companies. This component provides standard accounts receivable and accounts payable functions including dunning, posting documents, and making payments.

The business processes and functions of the FI-CA component may be integrated with a customer relationship management client, such as the CRM Interaction Center Web Client, by means of a financial customer care component. Example CRM functions include the following: (1) financial customer care (this scenario offers basic functions, such as an account overview, the display of the dunning history, and the search for payments of a customer); and (2) collections management (this scenario covers important processes, such as the initiation of customer calls, processing of payments, and the granting of deferrals and installment plans).

A billable item is created by a business transaction or business event and is an item that is to be billed. A billable item can have different statuses at different points in time. In billing, the system considers only those billable items that have the status "billable." Once these items are successfully processed during billing, the system sets their status to "billed." The various statuses of billable items may be reflected on a technical level using different database tables. According to embodiment, there is one database table for each combination of status and billable item class. One exception to this rule is the status "billed." For this status, the user can specify how many tables are used, and how they are to be used. As an example, the system 200 allows the system operator to configure up to 100 parallel tables for transactional use.

The upload rule specifies that the system does one of the following with billable items during the transfer: (1) adds them directly to the table of billable items; (2) adds them to the table for raw data; and (3) returns them as having errors.

In relation to the database tables used, the system may differentiate based on the following record types: (1) main items, which represent the actual receivable or payable; and (2) record types dependent on main items, which represent attachments to the main items (for example, credit card payments or taxation information). The main items and the dependent record types may use separate database tables.

The billable item class determines the following technical attributes of a billable item: (1) database tables in which the system saves the billable items, dependent on their status and on the record type they belong to; (2) function modules that receive the billable items; (3) function modules that save the billable items to the appropriate database tables; and (4) specific fields of billable items that are added either by customer selection of interface components or using customer fields. For each billable item class, customer-specific checks and data enrichment can be added at various events.

The interface component represents a business process from the viewpoint of billing. The interface component defines which business transactions a billable item class supports (such as deferred revenues and down payment clearings). Interface components are therefore the interface of a billable item class. From a technical perspective, an interface component consists of the documentation of the component, the selection of needed fields, and the specification of dependent/prerequisite interface components, along with checks, derivations, and assignments of field values.

A source transaction is defined by the combination of a source transaction type and source transaction identification. A source transaction represents a group of billable items that belong together from a business viewpoint. According to an embodiment, further processing of billable items may be controlled by the source transaction (that is, by each combination of a source transaction ID and source transaction type). A source transaction can include billable items belonging to different record types.

The billable item type, together with the subprocess, specifies the business significance of an individual billable item. Each item type is assigned to one or more subprocesses.

A subprocess is a self-sufficient processing branch within a billing process for the selection and grouping of billable items and forming a billing document. According to an example embodiment, billable items are immediately assigned to a subprocess when they are created. In such an example embodiment, it is not desirable for the system to process them together with billable items of another subprocess in a common billing document.

The billing process is the superordinate term for the execution of billing according to defined rules. These rules are defined by parameters used to control the billing process. The billing process specifies which subprocesses it supports. For each subprocess, the billing process specifies: (1) which contract accounts are billed; (2) which billable items are selected for billing; and (3) how the billable items are grouped into billing units and, as a consequence, how they are grouped into billing documents.

The selection variant specifies which billable item class the billable items are selected from, and therefore, which billable items are processed in the billing process.

The grouping variant is used for storing the rules for automatic grouping of billable items for processing during billing. The grouping variant determines which billable items are grouped together in one billing unit and controls the link between the billable items and the items of the billing document.

An invoicing process is the superordinate term for the execution of invoicing functions according to defined rules. The invoicing process controls: (1) selection of the source documents to be invoiced; (2) summary of source documents to invoicing units; and (3) selection of invoicing functions.

As discussed above, the system 200 may select and move the records 310 to the tables (see 320 and 322 above) as part of other data processing operations. One such data processing operation is the billing process. In general, billing takes place in four individual process steps: data selection, creation of billing units, aggregation of billable items, and updating.

During data selection, the system 200 selects the billable items for the billing process. For example, this selection may also be used as the selection described above at 320. The user may define the selection criteria for the data selection in selection variants for the billing process.

During the creation of billing units, the system 200 groups together the selected billable items into billing units for each contract account. Multiple billing units can be created for each contract account. Billing in Contract Accounts Receivable and Payable creates one billing document for each billing unit. The user may define the criteria that are used to create the billing units in grouping variants for the billing process.

During the aggregation of billable items, the system 200 includes the selected billable items of a billing unit in the billing document. More exactly, the billable items are summarized in billing document items. The individual items that belong to this summarization are linked with the billing document item.

During updating, the system 200 writes the billing document created for the billing unit and the individual billed items to the database, and at the same time deletes the processed billable items.

Figure 4:
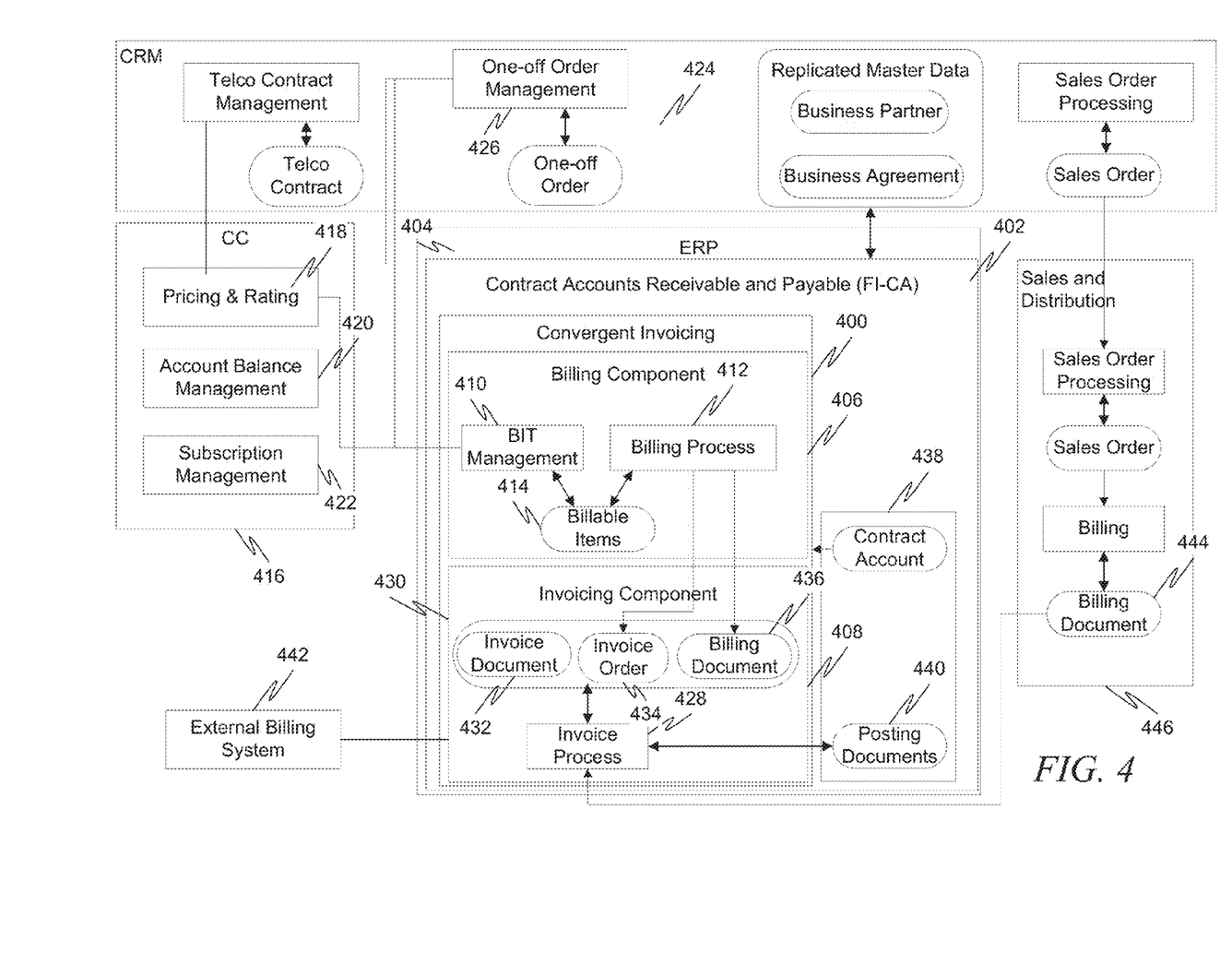
FIG. 4 is a diagram illustrating a convergent invoicing system within an ERP, in accordance with an example embodiment.

FIG. 4 is a diagram illustrating a convergent invoicing system within an ERP, in accordance with an example embodiment. Convergent invoicing system 400 may be run within a FI-CA system 402 within an ERP 404. The convergent invoicing system 400 may include a billing component 406 and an invoicing component 408. The billing component 406 may include a billable item (BIT) management component 410, a billing process 412, and billable items 414. The billable items 414, as described earlier, may be stored in a database. The BIT management component 410 may interface with a convergent charging (CC) component 416. The CC component 416 has the ability to control services and manage balances in real-time. This includes, for example, authenticating a customer and checking the account balance before service delivery to the customer (an example service delivery may be an Internet download). It can also notify users when the account balance threshold set by the operator is reached, or terminate service connectivity when real-time charging indicates that credit has been depleted. This is accomplished using a pricing and rating module 418, an account balance management component 420, and a subscription management component 422.

The BIT management component 410 may also interface with a CRM system 424 and, specifically, the one-off order management component 426 of the CRM system 424.

The invoicing component 408 may include an invoice process 428, as well as invoice data 430, which includes at least one invoice document 432, at least one invoice order 434, and at least one billing document 436. The invoice process 428 may coordinate with a database 438 to post documents 440 and generate the invoice data 430, as well as coordinate with an external billing system 442 to actually send out bills.

The invoice process 428 also interfaces with billing documents 444 generated by a sales and distribution component 446.

Certain components within an ERP system 404 may desire specialized interfaces to communicate with each other. Commonly convergent charging utilizes huge remote function call (RFC) interfaces with cryptic fieldnames and ABAP internal data types. In the case of JAVA to ABAP communication, the use of packed fields specifically often creates issues with decimals. Oftentimes, the field semantics of the backend fields are not known to the external system, and are thus hard to maintain.

For example, a convergent charging component 416 may intercept a telephone call and attempt to determine an associated cost per minute to apply to the call. This cost per minute then needs to be communicated to a convergent invoicing component 400 in order to generate an invoice for that cost. However, the convergent charging component 416 may be designed to operate with a certain currency data type, such as a number including two digits after the decimal point (for example, as commonly used in U.S. Dollars). The convergent charging component 416, however, may generate a cost per minute using a different data type, such as a number including six digits after the decimal point.

Typically what would need to be done in such instances is to generate a specific RFC just to handle the new data type (the one with six digits after the decimal place) and integrate that new RFC into the convergent charging component 416. Furthermore, the currency keys defined ERP may need to be replicated into the convergent charging component 416 so that convergent charging can transfer the cost per minute with a valid currency key (e.g., if the price is in U.S. Dollars and is kept within 6 decimal places, a 'technical currency key' may be defined in ERP that allows 6 decimal places).

In an example embodiment, a configuration transaction is provided for a proxy definition (e.g., fieldnames, datatypes) and generation of the configured query. An option to rename fields, use different data types in the proxy interface, and add conversion algorithms during the mapping of the proxy to the backend API can also be provided. As such, as will be seen, the configuration of the fieldnames and related datatypes can be independent from the underlying communication technique (e.g., Web-Services). In general, this configuration and generation framework is open to any communication technique. The generated proxy can then be tailored to the needs/capabilities of the system sending the data into the backend system. For example, if a system is only capable of sending string, timestamp, and decimal fields, the proxy could make use of corresponding datatypes ABAP.

Figure 5:
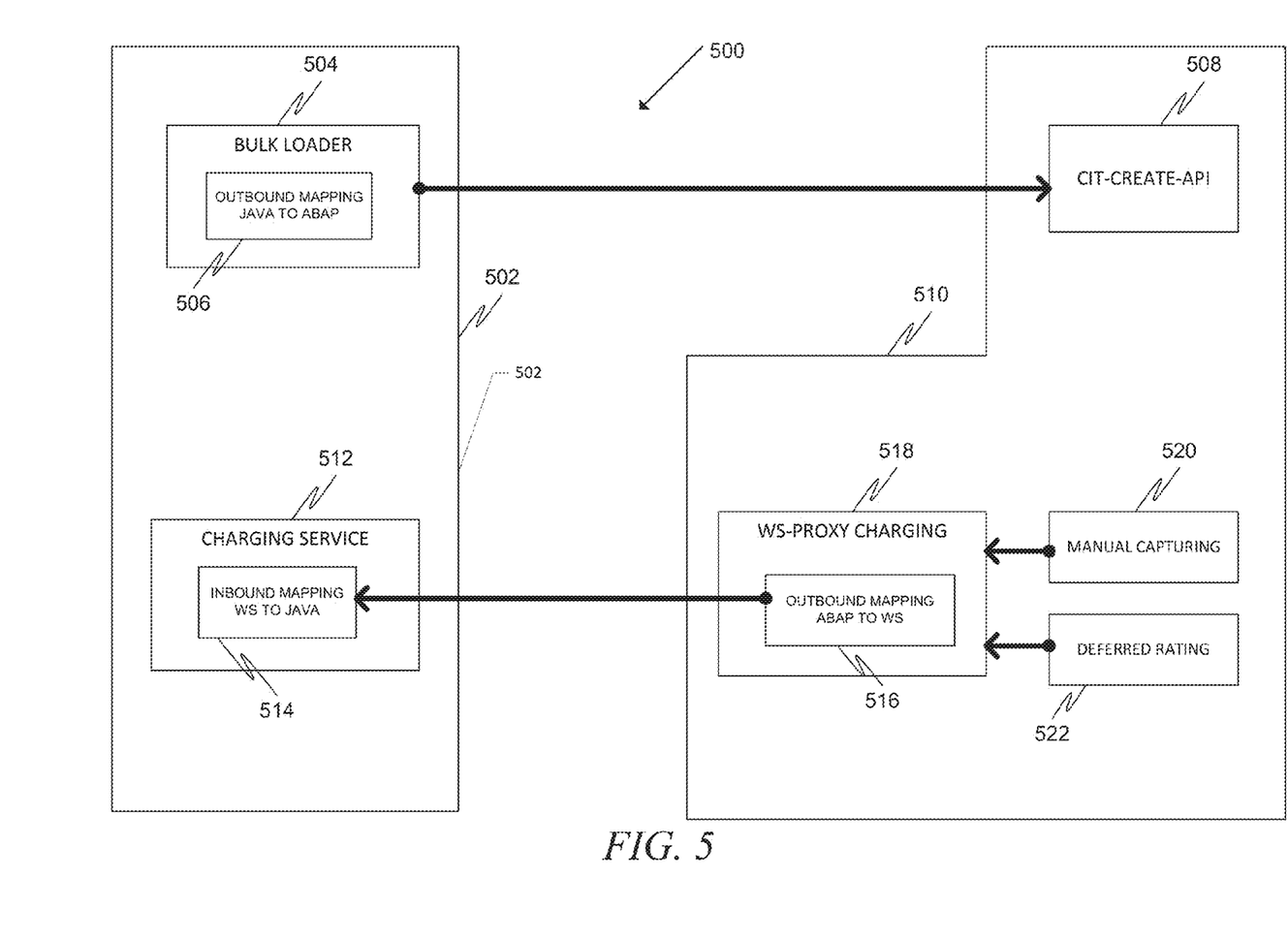
FIG. 5 is a block diagram illustrating a method 500 for interaction between a convergent charging component and a convergent invoicing component.

FIG. 5 is a block diagram illustrating a method 500 for interaction. between a convergent charging component and a convergent invoicing component. Within the convergent charging component 502, a bulk loader 504 creates an outbound mapping of JAVA to ABAP 506. This mapping maps to a specialized RFC 508 on the convergent invoicing component 510. If this RFC 508 is not designed to handle a data type (e.g., a number with six digits after the decimal), then one solution would be to have another API (not pictured) created to handle this different data type. This leads to complexity and delays in the system, however.

Additionally, a charging service 512 on the convergent charging component 502 maintains an inbound mapping of WS to Java 514, which corresponds to the outbound mapping of ABAP to WS 516 maintained by a WS-Proxy Charging component 518 on the convergent invoicing component 510. Manual capturing 520 and deferred rating 522 may feed into the WS-Proxy charging component 518.

Figure 6:
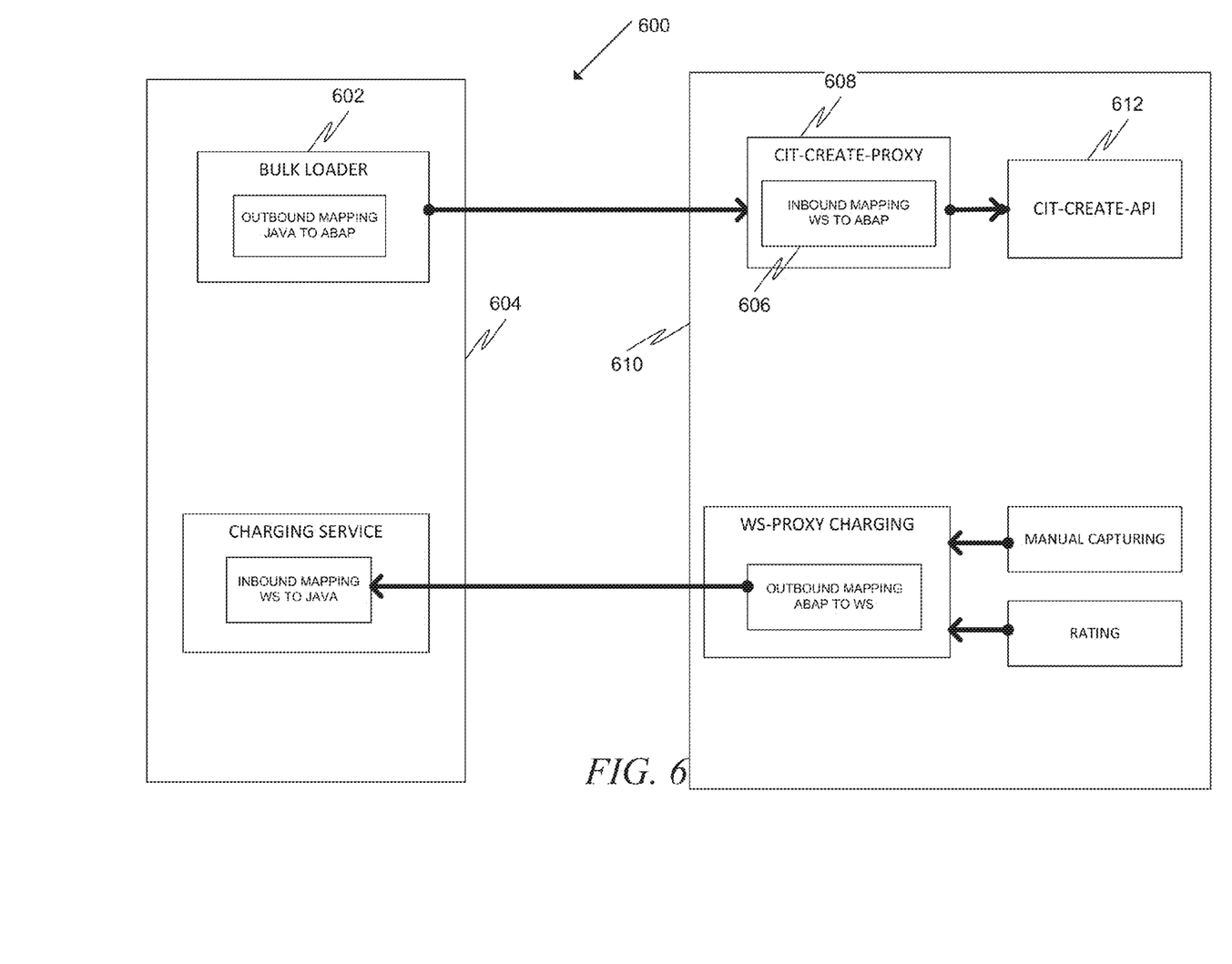
FIG. 6 is a block diagram illustrating a method 600, in accordance with an example embodiment, providing interaction between a convergent charging component and a convergent invoicing component.

FIG. 6 is a block diagram illustrating a method 600, in accordance with an example embodiment, providing interaction between a convergent charging component and a convergent invoicing component. As can be seen here, the bulk loader 602 on the convergent charging component 604 maps to an inbound mapping of WS to ABAP 606 is maintained by an RFC proxy component 608, called CIT create proxy on the convergent invoicing component 610. This proxy component 608 then uses the mapping to convert and/or send the data to the right data fields that are known and acceptable to the RFC 612.

Figure 7:
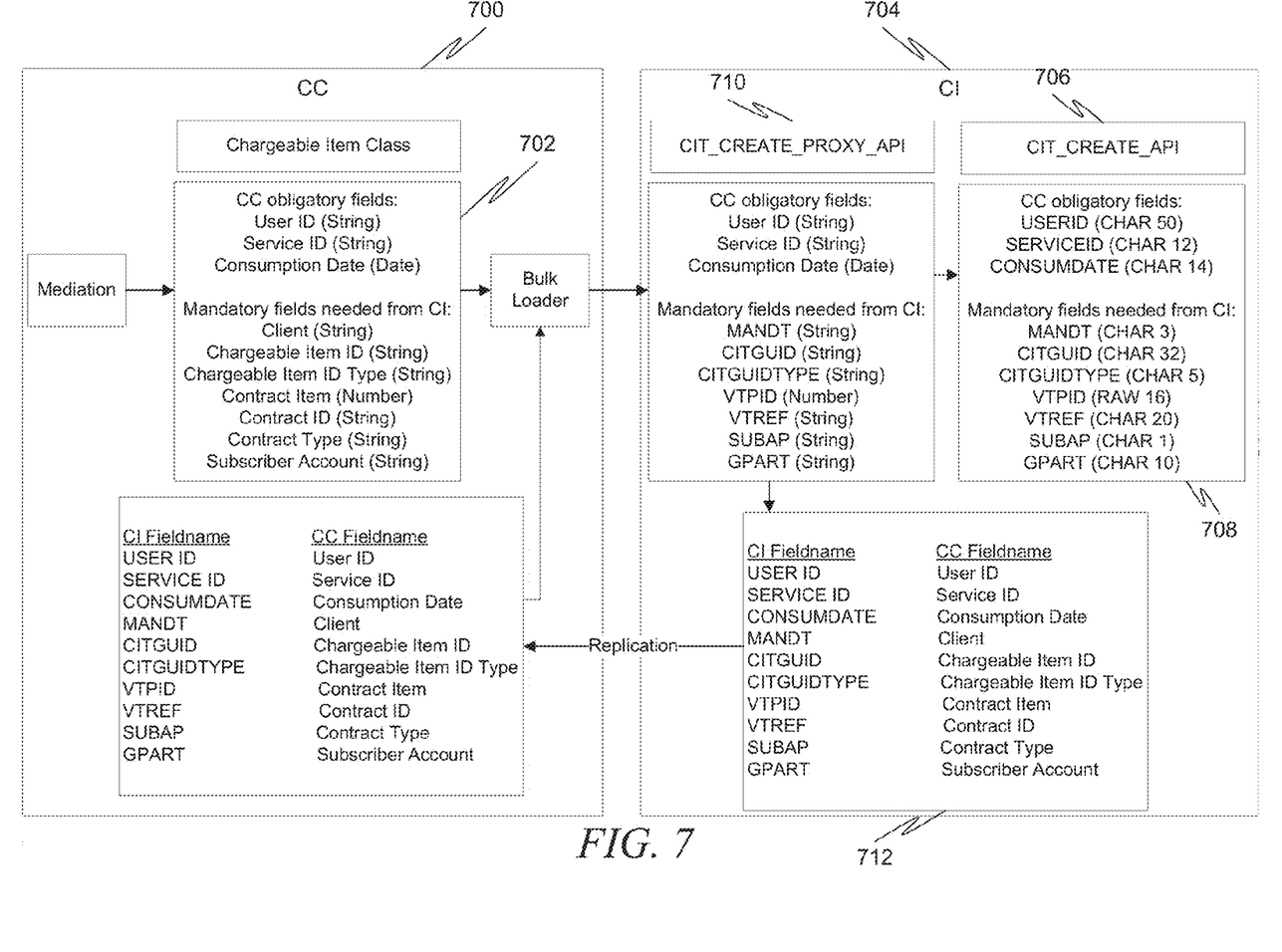
FIG. 7 is a diagram illustrating a process, in accordance with an example embodiment, of providing an RFC proxy.

FIG. 7 is a diagram illustrating a process, in accordance with an example embodiment, of providing an RFC proxy. Here, a convergent charging component 700 contains a process that utilizes certain data types 702. Likewise, a convergent invoicing component 704 contains an RFC 706 that utilizes certain data. types 708. Data types 702 differ somewhat from data types 708. For example, as can be seen, consumption date field in data types 702 is of the data type "date", whereas a corresponding field "CONSUMDATE" in data types 708, while not only having a different name, also is of a different data type, namely a character field of size 14. Likewise, the contract item field in data types 702 is of a type "Number", but the corresponding field in data types 708 is listed as VTPID and is of the type "RAW 16" (i.e., raw data of size 16).

In an example embodiment, proxy RFC 710 is created. The proxy RFC 710 maintains a field mapping table 712, which contains a mapping of data types 702 from the convergent charging component 700 to data types 708 in the convergent invoicing component 704. This field mapping table may then be utilized when function calls occur from the convergent charging component 700 to the convergent invoicing component 704, which the proxy RFC 710 receives, then converts or maps the data according to the field mapping table 712, and then forwards to the RFC 706 for processing. The field mapping table 712 may be replicated on the convergent charging component 700 as well.

It should be noted that while the convergent charging and convergent invoicing components are 704 discussed specifically in this document, the disclosure contained herein is not limited to these components, and in fact any component in an ERP system 404 can utilize the methods and systems described herein.

Figure 8:
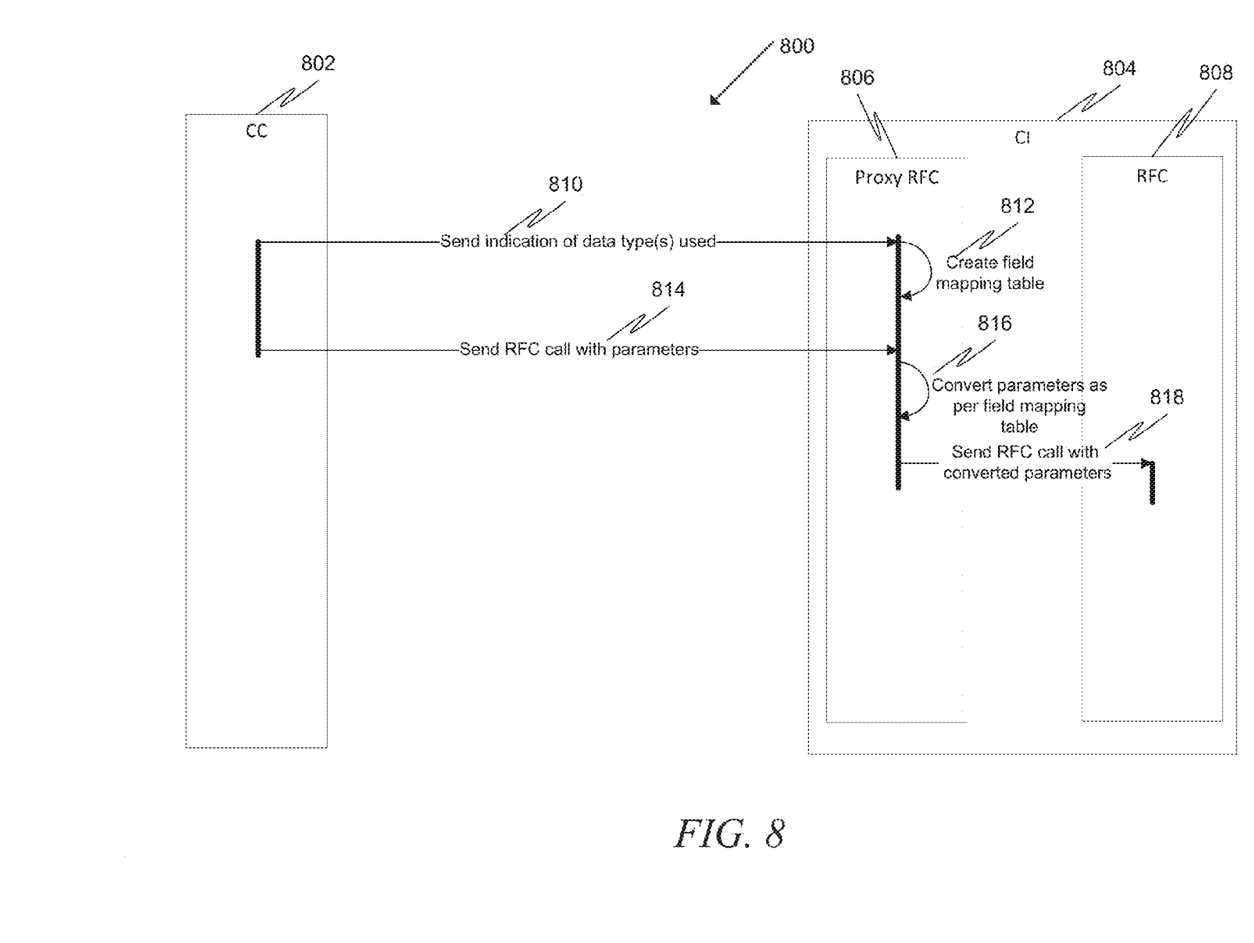
FIG. 8 is an interaction diagram illustrating a method 800, in accordance with an example embodiment, of providing a proxy RFC.

FIG. 8 is an interaction diagram illustrating a method 800, in accordance with an example embodiment, of providing a proxy RFC. The method 800 involves a convergent charging component 802 and a convergent invoicing component 804, although one of ordinary skill in the art will recognize that any ERP component 404 could be substituted for either of these components. The convergent invoicing component 804 may include a proxy RFC 806 and an RFC 808. At 810, the convergent charging component 802 may send an indication of one or more requested data types to the proxy RFC 806. This indication may be sent during design or setup time, and as such likely would not be an RFC call per se. The indication may include, for example, an ISO currency code. At 812, the proxy RFC 806 may create a field mapping table based upon this indication. This may include, for example, looking up the ISO currency code in a table that indicates compatible data types. At 814, the convergent charging component 802 may send an RFC call with parameters. At 816, the proxy RFC 806 converts these parameters as per the field mapping table. At 818, the proxy RFC 806 may send the RFC call with the converted parameters to the RFC 808 for execution.

Figure 9:
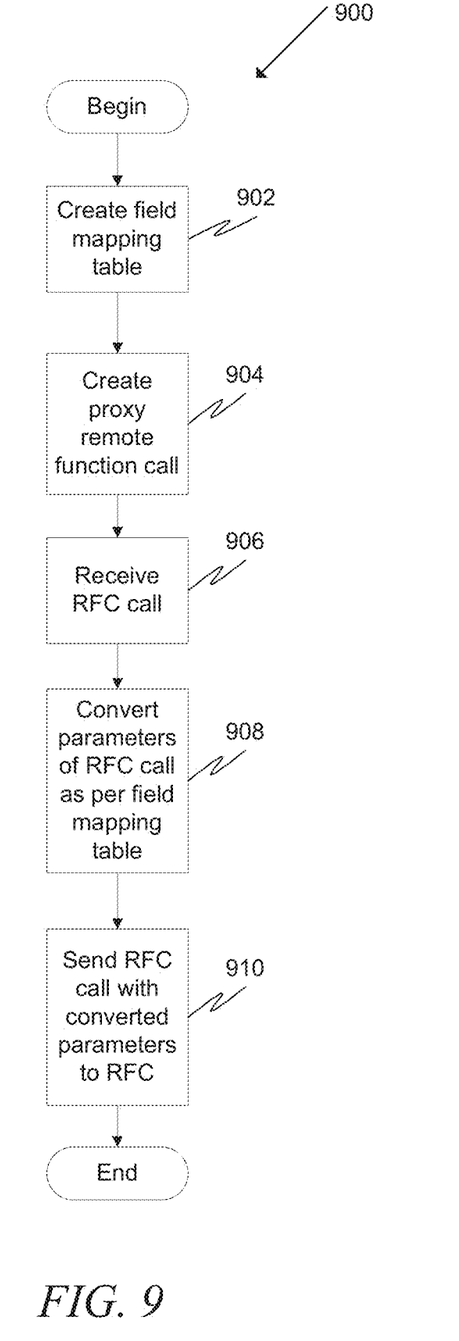
FIG. 9 is a flow diagram illustrating a method 900, in accordance with an example embodiment, of providing a proxy RFC.

FIG. 9 is a flow diagram illustrating a method 900, in accordance with an example embodiment, of providing a proxy RFC 806. At 902, a field mapping table may be created. In one embodiment, the field mapping table is created for the proxy remote function call. The field mapping table may contain a mapping of first data fields used for operation of a process in a second component of the ERP system to second data fields utilized by the remote function call in the first component, at least one of the first data fields mapping to a data field in the second data fields having a different data type.

At 904, a proxy remote function call may be created. In one embodiment, the proxy remote function call is created in a first component of an Enterprise Resource Planning (ERP) system. The proxy remote function call may act as a proxy for a previously created remote function call in the first component.

At 906, an RFC call may be received. In one embodiment, a call is received from the process on the second component. The call may include parameters having one or more of the first data fields.

At 908, the parameters of the RFC call may be converted as per the field mapping table. For example, the one or more of the first data fields in the parameters are converted to one or more second data fields according to the field mapping table.

At 910, the RFC call, with the converted parameters, can be sent to the RFC 808. For example, the call, including the parameters with the converted data fields, is passed to the remote function call for execution.

Figure 10:
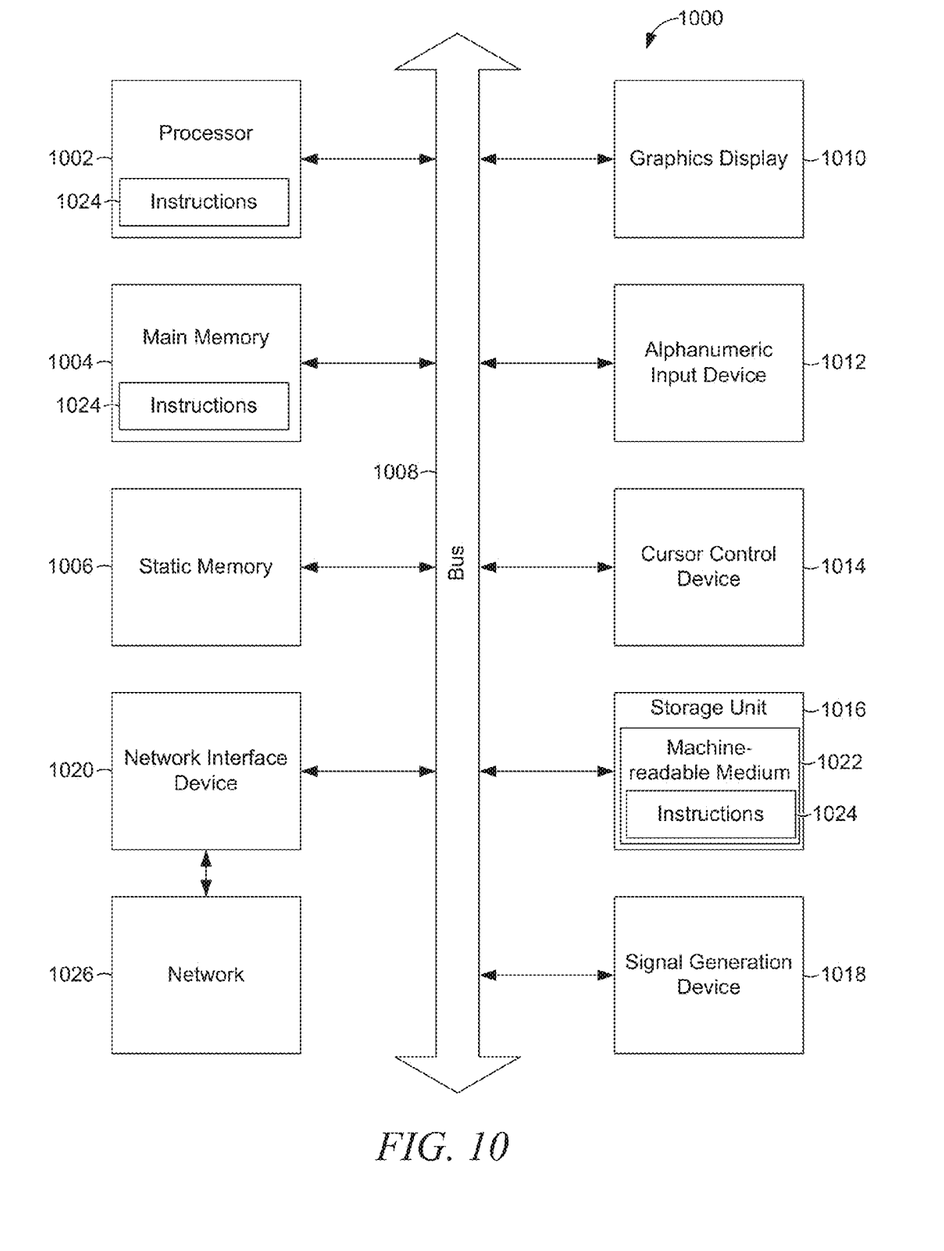
FIG. 10 is a block diagram of a computer processing system at a server system, within which a set of instructions, for causing the computer to perform any one or more of the methodologies discussed herein, may be executed.

FIG. 10 is a block diagram of a computer processing system at a server system, within which a set of instructions, for causing the computer to perform any one or more of the methodologies discussed herein, may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1000 includes processor 1002 (e.g., a central processing unit (CRU), a graphics processing unit (GPU) or both), main memory 1004 and static memory 1006, which communicate with each other via bus 1008. The processing system 1000 may further include graphics display unit 1010 (e.g., a plasma display, a liquid crystal display (LCD), or a cathode ray tube (CRT)). The processing system 1000 also includes alphanumeric input device 1012 (e.g., a keyboard), a cursor control device (UI) navigation device 1014 (e.g., a mouse, touch screen, or the like), a disk drive unit 1016, a signal generation device 1018 (e.g., a speaker), and a network interface device 1020.

The disk drive unit 1016 includes computer-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the processing system 1000, with the main memory 1004 and the processor 1002 also constituting computer-readable, tangible media.

The software 1024 may further be transmitted or received over network 1026 via a network interface device 1020 utilizing any one of a number of well-known transfer protocols (e.g., Hypertext Transfer Protocol (HTTP)).

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While various implementations and exploitations are described, it will be understood that these embodiments are illustrative, and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A method, comprising:
   creating a proxy remote function call in a first component of an Enterprise Resource Planning (ERP) system, the proxy remote function call acting as a proxy for a previously created remote function call in the first component, the previously created remote function call being a procedure that, when executed, calls a function to be performed on a remote component, the proxy remote function call substituting for the previously created remote function call when calls are made by a second component, the first component and the second component being different applications within the ERP system;
   maintaining a field mapping table for the proxy remote function call, the field mapping table containing a mapping of first data fields used for operation of a process in the second component of the ERP system to second data fields utilized by the remote function call in the first component, at least one of the first data fields mapping to a data field in the second data fields having a different data type, wherein the maintaining the field mapping table comprises:
   receiving, from the process in the second component, an indication of a data type, the indication being an International Standard Organization (ISO) currency code; and
   using the indication of the data type to deduce a data type to be included in the field mapping table;
   receiving a call from the process on the second component, the call including parameters having one or more of the first data fields;
   converting the one or more of the first data fields in the parameters to one or more second data fields according to the field mapping table; and
   passing the call, including the parameters with the converted data fields, to the remote function call for execution.

2. The method of claim 1, wherein at least one of the first data fields is a web services data type.

3. The method of claim 1, wherein at least one of the first data fields is a JAVA data type.

4. The method of claim 1, wherein the data field in the second data fields is an Advanced Business Application Programming (ABAP) data type.

5. The method of claim 1, wherein the first component is a convergent invoicing component.

6. The method of claim 1, wherein the second component is a convergent charging component.

7. A method comprising:
   receiving at a proxy remote function call in a first component of an Enterprise Resource Planning (ERP) system, a call from a process in a second component of the ERP system, the call containing parameters having data fields, each data field having a data type;
   converting at least one of the data fields to a different data type based on a field mapping table maintained by the proxy remote function call, the field mapping table having been created by using an indication of a data type to deduce a data type to be included in the field mapping table, the indication of the data type comprising an International Standards Organization (ISO) currency code; and
   passing the call including the parameters with the converted data fields to a remote function call in the first component for execution, the remote function call being a procedure that, when executed, calls a function to be performed on a remote component, the proxy remote function call substituting for the previously created remote function call when calls are made by the second component, the first component and the second component being different applications within the ERP system.

8. The method of claim 7, wherein the field mapping table includes a mapping of data fields used by the process in the second component to data fields used by the remote function call in the first component, at least one of the data fields used by the process in the second component mapping to a data field having a different name and data type used by the remote function call in the first component.

9. A first component in an ERP system, the first component comprising:
   a processor configured to:
   creating a proxy remote function call in a first component of an Enterprise Resource Planning (ERP) system, the proxy remote function call acting as a proxy for a previously created remote function call in the first component, the previously created remote function call being a procedure that, when executed, calls a function to be performed on a remote component, the proxy remote function call substituting for the previously created remote function call when calls are made by a second component, the first component and the second component being different applications within the ERP system;
   maintaining a field mapping table for the proxy remote function call, the field mapping table containing a mapping of first data fields used for operation of a process in the second component of the ERP system to second data fields utilized by the remote function call in the first component, at least one of the first data fields mapping to a data field in the second data fields having a different data type, wherein the maintaining the field mapping table comprises:
   receiving, from the process in the second component, an indication of a data type, the indication being an International Standard Organization (ISO) currency code; and
   using the indication of the data type to deduce a data type to be included in the field mapping table;
   receiving a call from the process on the second component, the call including parameters having one or more of the first data fields;
   converting the one or more of the first data fields in the parameters to one or more second data fields according to the field mapping table; and
   passing the call, including the parameters with the converted data fields, to the remote function call for execution.

10. The first component of claim 9, wherein the first component is a convergent invoicing component.

11. The first component of claim 9, wherein the second component is a convergent charging component.

12. A non-transitory computer-readable storage medium comprising instructions that, when executed by at least one processor of a machine, cause the machine to perform operations comprising:
   creating a proxy remote function call in a first component of an Enterprise Resource Planning (ERP) system, the proxy remote function call acting as a proxy for a previously created remote function call in the first component, the previously created remote function call being a procedure that, when executed, calls a function to be performed on a remote component, the proxy remote function call substituting for the previously created remote function call when calls are made by a second component, the first component and the second component being different applications within the ERP system;

maintaining a field mapping table for the proxy remote function call, the field mapping table containing a mapping of first data fields used for operation of a process in the second component of the ERP system to second data fields utilized by the remote function call in the first component, at least one of the first data fields mapping to a data field in the second data fields having a different data type, wherein the maintaining the field mapping table comprises:

receiving, from the process in the second component, an indication of a data type, the indication being an International Standard Organization (ISO) currency code; and using the indication of the data type to deduce a data type to be included in the field mapping table;

receiving a call from the process on the second component, the call including parameters having one or more of the first data fields;

converting the one or more of the first data fields in the parameters to one or more second data fields according to the field mapping table; and passing the call, including the parameters with the converted data fields, to the remote function call for execution.

13. A non-transitory computer-readable storage medium comprising instructions that, when executed by at least one processor of a machine, cause the machine to perform operations comprising:

receiving at a proxy remote function call in a first component of an Enterprise Resource Planning (ERP) system, a call from a process in a second component of the ERP system, the call containing parameters having data fields, each data field having a data type;

converting at least one of the data fields to a different data type based on a field mapping table maintained by the proxy remote function call, the field mapping table having been created by using an indication of a data type to deduce a data type to be included in the field mapping table, the indication of the data type comprising an International Standards Organization (ISO) currency code; and passing the call including the parameters with the converted data fields to a remote function call in the first component for execution, the remote function call being a procedure that, when executed, calls a function to be performed on a remote component, the proxy remote function call substituting for the previously created remote function call when calls are made by the second component, the first component and the second component being different applications within the ERP system.

14. The non-transitory computer readable storage medium of claim 13, wherein the field mapping table includes a mapping of data fields used by the process in the second component to data fields used by the remote function call in the first component, at least one of the data fields used by the process in the second component mapping to a data field having a different name and data type used by the remote function call in the first component.

15. The non-transitory computer readable storage medium of claim 13, wherein the at least one of the data fields is a web services data type.

16. The non-transitory computer readable storage medium of claim 13, wherein the at least one of the data fields is a JAVA data type.

17. The non-transitory computer readable storage medium of claim 13, wherein the different data type is an Advanced Business Application Programming (ABAP) data type.

* * * * *